(No Model.)  2 Sheets—Sheet 1.

E. J. HESS.
BLANK CLIP FOR SPRING HEADS.

No. 341,479.  Patented May 11, 1886.

ATTEST
Jno. W. Strehli
Marion M. Smith

INVENTOR
Elmer J. Hess
per Wm. Hubbell Fisher,
ATT'Y (No Model.)
E. J. HESS.
BLANK CLIP FOR SPRING HEADS.
No. 341,479. Patented May 11, 1886.
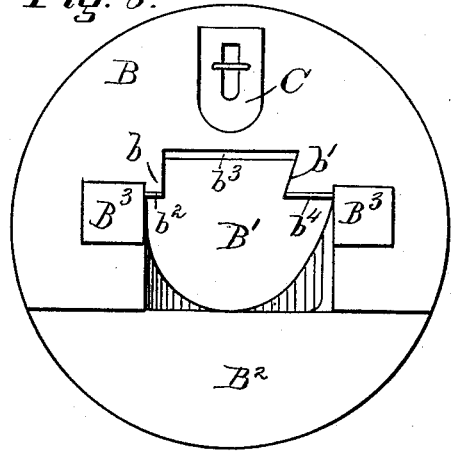
Fig. 8.
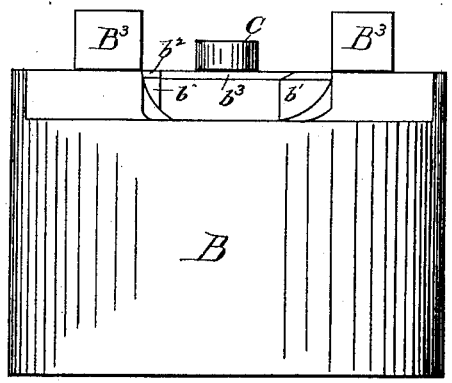
Fig. 9.
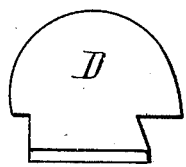
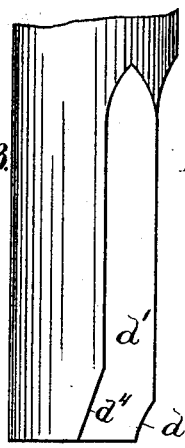
Fig. 13.
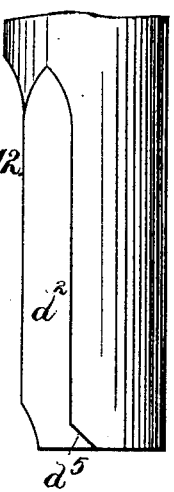
Fig. 12.
Fig. 10.
Fig. 14.    Fig. 11.
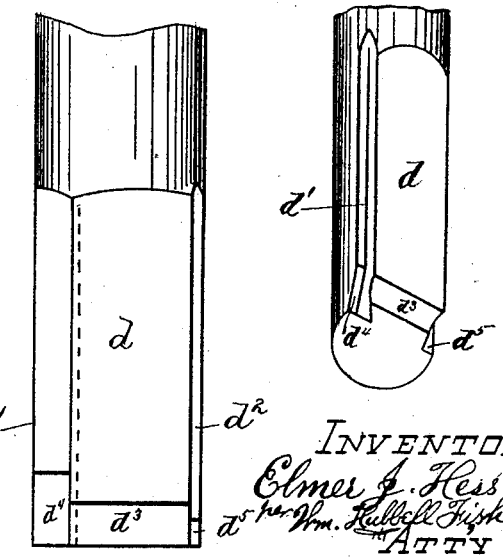
Attest
Jno. W. Strehli
Marion M. Smith
Inventor
Elmer J. Hess
per Wm. Bulkell Fisher,
Atty

UNITED STATES PATENT OFFICE.

ELMER J. HESS, OF CINCINNATI, OHIO.

BLANK CLIP FOR SPRING-HEADS.

SPECIFICATION forming part of Letters Patent No. 341,479, dated May 11, 1886.

Application filed February 25, 1886. Serial No. 193,155. (No model.)

*To all whom it may concern:*

Be it known that I, ELMER J. HESS, of the city of Cincinnati, Hamilton county, and State of Ohio, have invented certain new and useful Improvements in Clips for Elliptical Spring-Heads, of which the following is a specification.

The object of my invention is to provide a spring-clip which, while being simple in construction, shall also possess great strength.

The various features of the invention and their advantages will be fully understood from the following specification.

Figure 2:
Figure 1:
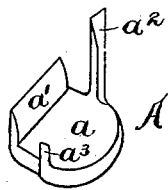
Figure 3:
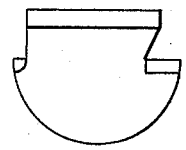
Figure 6:
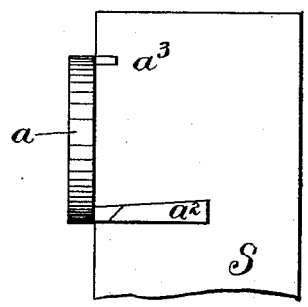
Figure 5:
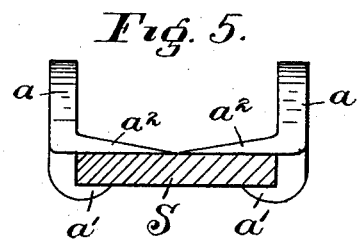
Figure 7:
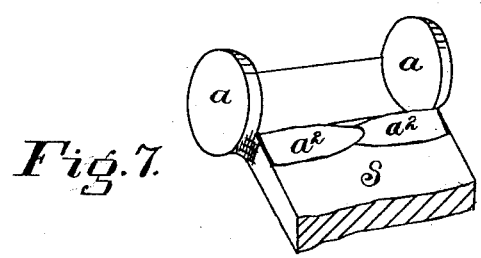
Figure 4:
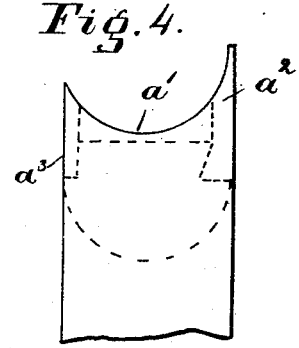

In the accompanying drawings, Figures 1 and 2, Sheet 1, are perspective views of my improved clip. Fig. 3 is a top view of the clip. Fig. 4 is a view of the strip of metal from which the clip is cut, and shows in dotted lines the outline of the blank. Fig. 5 is an end view of a spring-leaf, with two clips in position ready for welding. Fig. 6 is a top view of the device shown in Fig. 5, one clip only being shown. Fig. 7 is a perspective view of a spring provided with my improved clip. Fig. 8 is a top view of the female element of the die used in producing my clip. Fig. 9 is a side or front elevation of the die shown in Fig. 8. Fig. 10 is a perspective view of the die shown in Figs. 8 and 9. Figs. 11 is a perspective view of the male element of the die used in stamping out my clip. Fig. 12 is a side elevation of the die shown in Fig. 11. Fig. 13 is an elevation of the die shown in Fig. 12, illustrating its opposite side. Fig. 14 is a front elevation of the die shown in Fig. 11.

The clip A is made from a single piece of metal, and consists of a flat plate, $a$, the straight edge of which is turned up to form the flange $a'$, and the edges of the plate at the ends of the flange $a'$ are cut and turned up to form the tongues $a^2$ and $a^3$.

The female die B is a block of hard metal, having an opening, B', running entirely through it. The opening B' has substantially the shape shown in Fig. 8. In the outline of opening B' attention is to be particularly directed to the shoulders $b$ and $b'$. Three of the straight edges of the opening B' in die B are beveled, so that the metal may roll in as the clip is being punched, and form the tongues $a'$ $a^2$ $a^3$. These bevels $b^2$, $b^3$, and $b^4$ are shown in Figs. 8, 9, and 10.

The face of the die B is lowered in front of the curved edge of opening B', forming the face $B^2$, and a space the full width of the opening B' is cut from the face $B^2$ diagonally upward to the edges of the shoulders $b$ $b'$, leaving the shoulders $b^2$ $b^3$. In cutting out the clip the strip of metal from which the clip is punched fits between the shoulders $b^2$ and $b^3$. I also preferably provide the die B with guides $B^3$, one on either side of the opening B'. An adjustable stop, C, is attached to the top of the die B.

The male portion of the die is cut from a round or square bar. One side is flattened to form the face $d$, which passes the straight edge of the opening B'. On either side of the face $d$ a groove is cut. The groove $d'$ on one side accommodates the shoulder $b'$, and the groove $d^2$ on the other side accommodates the shoulder $b$ of die B. The lower edge of the face $d$ is provided with the bevel $d^3$, preferably slightly curved, and which determines the height of the flange $a'$ of the clip. The lower ends of the grooves $d'$ and $d^2$ are provided, respectively, with bevels $d^4$ and $d^5$, which form the tongues $a^2$ and $a^3$ of the clip. The length of each bevel determines the length of the tongue which it forms, and as the tongue $a^3$ is preferably shorter than the tongue $a^2$ the bevel $d^5$ is usually made shorter than the bevel $d^4$.

In making the clips the strip of hot metal is inserted between the guides $B^3$ and pushed as far as the gage C. The die D, coming down, cuts a blank from the strip of shape shown by the dotted lines in Fig. 4. In Fig. 4 the dotted lines show the lines of the cuts made in the metal by the dies. As the die D descends, it pushes the metal downward, and drags in enough metal to fill the spaces left between the bevels $d^3$, $d^4$, and $d^5$ and the edge of the die B. As soon as the top of each bevel reaches the edge of die B, it cuts off the surplus metal met there, and determines the top of the tongue which it is forming. In this process the tongues $a^2$ and $a^3$ are cut from the strip of metal forming the strip and turned up without destroying their grain.

The clips are made rights and lefts, and are used as shown in Figs. 5, 6, and 7. The clips are fitted to the leaf S of the spring opposite to each other, and in such manner that the spring-leaf fits between the tongues $a^2$ and $a^3$ on one side and the tongue $a'$ on the other. In this shape the clips and spring-leaf are subject to strong and sudden pressure, welding the three together and producing the shape shown in Fig. 7. It is readily seen that clips made and applied in this way have the grain of the metal running in the direction to give the greatest strength to the spring.

What I claim as new and of my invention, and desire to secure by Letters Patent, is—

1. As a separate article of manufacture, the clip A, having tongues $a'$ $a^2$ $a^3$, substantially as and for the purposes specified.

2. As a separate article of manufacture, the clip A, having the tongues $a^2$ and $a^3$ cut lengthwise from the blank, and having the grain of the metal undisturbed by the swaging.

ELMER J. HESS.

Witnesses:
E. M. HARMON,
JNO. W. STREHLI.